United States Patent [19]

Lowell et al.

[11] 4,385,039

[45] May 24, 1983

[54] PROCESS FOR REMOVAL OF SULFUR OXIDES FROM WASTE GASES

[75] Inventors: Philip S. Lowell; James L. Phillips, both of Austin, Tex.

[73] Assignee: Koppers Company, Inc., Pittsburgh, Pa.

[21] Appl. No.: 382,486

[22] Filed: May 27, 1982

Related U.S. Application Data

[63] Continuation-in-part of Ser. No. 303,360, Sep. 18, 1981, abandoned.

[51] Int. Cl.³ .................. C01B 17/00; B01J 8/00; C01D 8/00
[52] U.S. Cl. .................................. 423/242; 423/244; 423/421; 423/422; 423/428
[58] Field of Search .......... 423/242 A, 242 R, 244 A, 423/244 R, 421, 422, 428, 166, 275, 512 A

[56] References Cited

U.S. PATENT DOCUMENTS

| 1,215,517 | 2/1927 | Gillen | 423/421 |
| 1,756,122 | 4/1930 | Hellmes | 423/422 |
| 2,196,004 | 4/1940 | Bacon et al. | 423/242 |
| 3,775,532 | 11/1973 | Shah | 423/242 |
| 3,846,535 | 12/1974 | Rivers et al. | 423/244 |
| 4,146,569 | 3/1979 | Giammarco et al. | 423/243 |

FOREIGN PATENT DOCUMENTS

| 49-40356 | 1/1974 | Japan | 423/275 |
| 53-31837 | 5/1978 | Japan | 423/244 |

Primary Examiner—O. R. Vertiz
Assistant Examiner—Gregory A. Heller
Attorney, Agent, or Firm—Donald M. MacKay; Herbert J. Zeh, Jr.

[57] ABSTRACT

A process for removing sulfur oxides from waste gas is provided. The gas is contacted with a sorbent selected from sodium bicarbonate, trona and activated sodium carbonate and, utilizing an alkaline liquor containing borate ion so as to reduce flow rates and loss of alkalinity, the spent sorbent is regenerated with an alkaline earth metal oxide or hydroxide.

11 Claims, 1 Drawing Figure

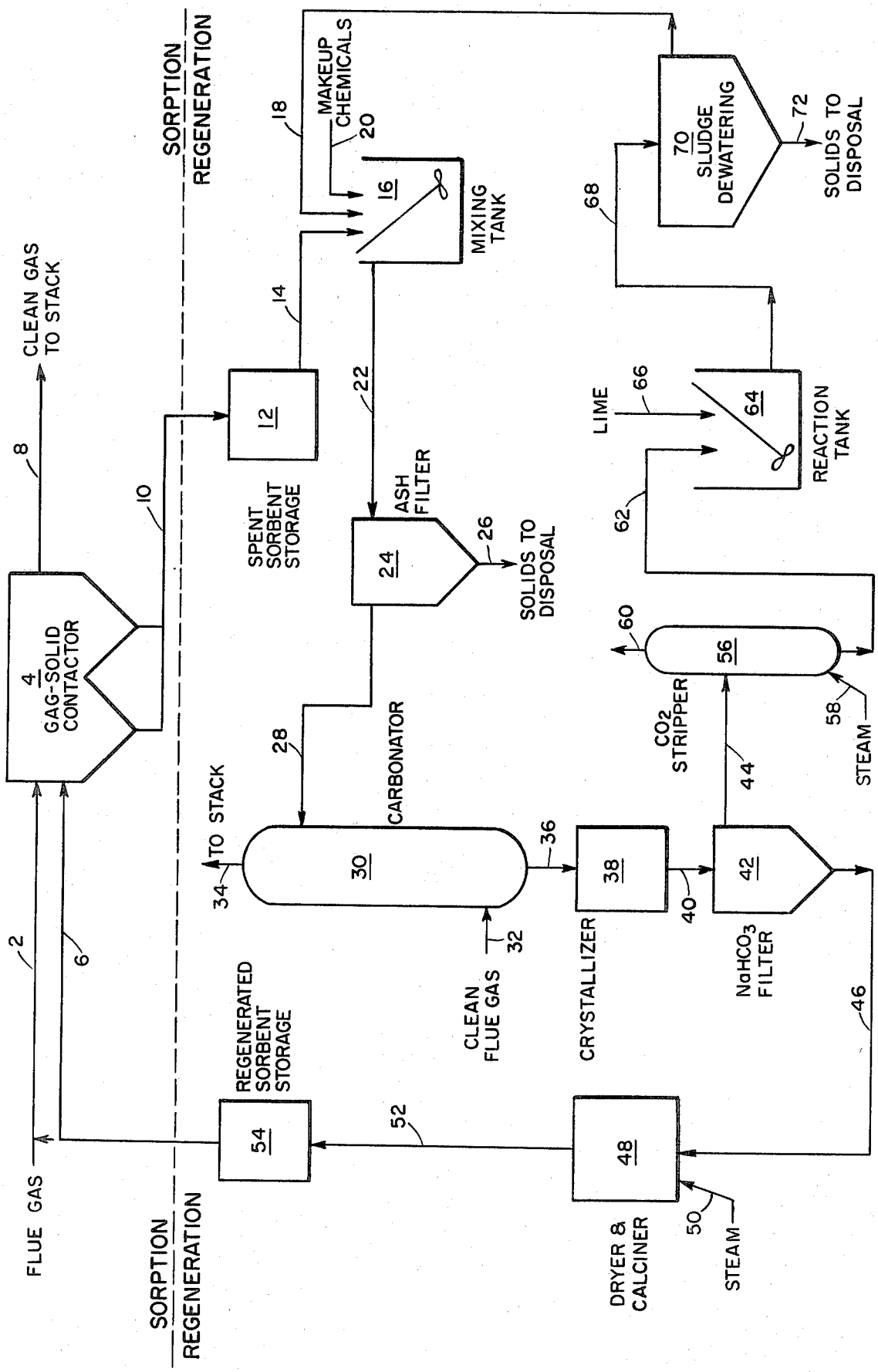

PROCESS FOR REMOVAL OF SULFUR OXIDES FROM WASTE GASES

CROSS-REFERENCE TO RELATED APPLICATION

This application is a continuation-in-part of U.S. Ser. No. 303,360 filed Sept. 18, 1981, now abandoned.

BACKGROUND OF THE INVENTION

This invention relates to a process for absorbing sulfur oxides from industrial waste gases with a solid sorbent and regenerating the solid sorbent for reuse.

In the combustion of fossil fuels, and in many industrial processes, a serious problem is presented by the combustion of the sulfur-containing components therein. The noxious sulfur oxides produced are an environmental pollutant and in recent years considerable effort has been made to remove the sulfur oxides from the combustion gasses exhausted to the atmosphere. Several methods for removing such oxides are known. For example, U.S. Pat. No. 3,852,410 issued to Rivers et al., and U.S. Pat. No. 3,846,535 issued to Fonseca, are illustrative. To applicant's knowledge, however, all prior art processes have certain disadvantages and, consequently, an improved method for economically reliably removing sulfur oxides from gaseous mixtures would be desirable and is herein provided.

BRIEF SUMMARY OF THE INVENTION

Briefly, the process of the invention comprises treating the waste gas containing sulfur oxide (which is principally and hereinafter for convenience referred to as sulfur dioxide) with a solid sorbent selected from the class consisting of activated sodium carbonate, sodium bicarbonate, trona and mixtures thereof which can remove 90 percent or more of the sulfur dioxide. Trona is the mineral name for $Na_2CO_3NaHCO_3 2H_2O$. Activated sodium carbonate can be formed from sodium bicarbonate, trona or a mixture of the two, by calcining at a temperature between about 70° C. and about 200° C. For sodium bicarbonate having a characteristic particle dimension of about 50 microns, a calcination period of about 10 to about 30 minutes, at a temperature of about 150° C. will suffice. The sorbent may alternatively be added as an aqueous slurry or solution such that all the water will evaporate in the gas. The clean gas is vented and the resultant unreacted solids, sodium sulfites, sulfates and mixtures thereof, are dissolved in a basic liquor that is alkaline enough to convert carbonic acid to bicarbonate, said liquor containing borate ion, ammonia or preferably both, to form soluble sodium compounds. Carbonation of the resultant liquor forms a sodium precipitate containing bicarbonate, trona, or mixtures thereof.

The precipitate is separated from the carbonated liquor and the liquor treated with a precipitant compound selected from the class consisting of alkaline earth metal hydroxides, oxides and mixtures thereof to form insoluble alkaline earth metal sulfates, sulfites and mixtures thereof. Suitable alkaline earth metals include calcium, barium and strontium. After removing the solids, the liquor is recycled to treat spent sorbent.

The presence of borate ion (such as supplied by boric acid) in the process provides several distinct advantages. For one, it permits the use of lower flow rates in the regeneration loop of the process. Another important advantage is that, since borate ion does not degrade chemically or biologically to any significant extent there is little loss of borate ion in the system, which accordingly reduces the amount of materials utilized in the process. Moreover, since the borate ion does not act as a reducing agent in the regeneration loop or in the solid waste disposal area the sulfites and/or sulfates present are not reduced to noxious sulfur compounds as, for example, hydrogen sulfide which can present serious health and disposal problems. The use of ammonia provides similar advantages.

BRIEF DESCRIPTION OF THE DRAWING

The drawing is a schematic flow diagram of the process of the invention.

DETAILED DESCRIPTION OF THE INVENTION

Referring now to the drawing, a flue gas containing sulfur dioxide is fed via conduit 2 to a gas-solid contactor 4. Contactor 4, which can take many forms (e.g., fixed bed, moving bed, fluidized bed, etc.), is suitably a baghouse collector employing tube type fabric filter dust collecting surfaces preloaded with a suitable sorbent, which is introduced into contactor 4 via conduit 6. Alternatively, the sorbent may be introduced into the gas stream upstream of the contactor. Another embodiment is to dissolve or slurry the sorbent in water and inject it into the gas (e.g., in a spray drier) where the water vaporizes and the resulting solid enters contactor 4. On passing through the contactor 4, the sulfur dioxide in the flue gas reacts with the sodium containing sorbent to produce sodium sulfite and sulfate, leaving a flue gas substantially free of any sulfur dioxide and which is vented from contactor 4 via conduit 8.

A solids product is removed from contactor 4 via conduit 10 and transferred to a spent sorbent storage vessel 12. At this point, the solids product will comprise unused sorbent initially in gas-solid contactor 4 plus soluble sodium sulfite and/or sulfate resulting from the reaction of the sorbent with the sulfur dioxide in the flue gas and any particulate matter originally contained in the flue gas such as fly ash. The solids product is transferred to mixing tank 16 via conduit 14 where it is admixed with an alkaline recycle liquor containing borate ion from line 18 and makeup chemicals which can include $Na_2B_4O_7$, $Na_2CO_3$, $Na_2SO_4$, $NaCl$ or various mixtures of the above. In mixing tank 16, the soluble sulfite and/or sulfate which were formed by the reaction of the sulfur dioxide with the sorbent are dissolved. The liquor from mixing tank 16 is transferred via conduit 22 to a fly ash filter 24 where any fly ash is removed and disposed of via conduit 26. Conduit 26 may go to reaction tank 64 when not all of the sodium sulfite or sulfate from spent sorbent vessel 12 dissolved in mixing tank 16. The fly ash free liquor leaves filter 24 via conduit 28 is introduced into carbonator 30, and is reacted with $CO_2$, introduced into carbonator 30 via conduit 32. Clean flue gas is a convenient $CO_2$ source. Excess $CO_2$ leaves carbonator 30 via conduit 34 for venting to the atmosphere or, if preferred, to the clean gas stack via conduit 8. Bicarbonate ions are formed which are transferred via conduit 36 to crystallizer 38 and converted to solid sodium bicarbonate, trona, or mixtures thereof which crystallizes out of solution. Carbon dioxide may also be added to the crystallizer 38 to drive the crystallization of sodium bicarbonate toward completion. The sodium bicarbonate crystallized in crystallizer 38 is transferred via conduit 40 to sodium bicarbonate filter 42. The sodium bicarbonate and/or trona recovered from filter 42 is transferred via conduit 46 to dryer/calciner 48 where it is either dried and transferred via conduit 52 to regenerated sorbent storage vessel 54 or is dried and calcined to form an activated sodium carbonate which is likewise transferred via conduit 52 to regenerated sorbent storage vessel 54.

The liquid from filter 42 passes via conduit 44 into carbon dioxide stripper 56 where it is contacted countercurrently with a stripping gas (e.g., steam) introduced in the lower portion of stripper 56 via conduit 58. A portion of the $CO_2$, other undissolved gases and any remaining stripping gas is vented from stripper 56 via conduit 60. This $CO_2$ containing gas may be added to carbonator 30 or crystallizer 38. The $CO_2$ stripped liquor from stripper 56 is introduced, via conduit 62, into a reaction vessel 64 where it is contacted with an alkaline precipitant preferably lime introduced via line 66. In reaction tank 64, the precipitant, e.g. lime., reacts with the soluble sodium sulfite and/or sulfate to produce insoluble calcium sulfate and/or calcium sulfite and regenerate the alkaline liquor. The mixture in reaction tank 64 is transferred via conduit 68 to a sludge dewatering vessel 70 where the insoluble calcium sulfate and/or sulfite is disposed of via conduit 72, the liquid from vessel 70 being recycled, as noted above, to mixing tank 16 via conduit 18.

As can be seen from the drawing, the process is comprised of two basic steps, a sorption step and a regeneration step. In the sorption step, the sulfur dioxide in the flue gas is contacted with the sorbent and converted into soluble sulfate and/or sulfite compounds. In the regeneration step or loop, the sulfur species is ultimately purged from the process as an insoluble sulfur compound and the sorbent is regenerated for reuse in the sorption step.

The sorbent is preferably a sodium carbonate obtained by calcining a sodium-containing compound such as sodium bicarbonate, trona, or a mixture thereof at a temperature of from about 70° to about 200° C. It has been found that while sodium carbonate which has been produced by crystallizing directly from solution does not act as an effective sorbent in the process of the present invention, sodium carbonate produced by calcining sodium bicarbonate or trona makes an excellent sorbent and is easily obtained by calcining the precipitated sodium bicarbonate produced in crystallizer 38.

To remove the soluble sulfites and/or sulfates from the system, a precipitant of an alkaline earth metal hydroxide, oxide or mixture thereof is employed. Thus, for example, the process can employ an oxide or hydroxide of calcium, barium or strontium or mixtures thereof. The preferred alkaline earth metal is calcium.

As noted above with regard to the description of the drawing, the process, with advantage, employs a carbon dioxide stripper. The stripper, which can be any gas-liquid countercurrent contactor, serves to remove excess $CO_2$ from the process which would otherwise be precipitated as calcium carbonate in vessel 64, thereby increasing the use of lime in the process. The $CO_2$ stripper gas can include steam or an oxygen-containing gaseous medium such as, for example, air.

As pointed out above, the process of the present invention utilizes borate ion in the liquor in mixing tank 16. The ultimate source of alkalinity in the process is supplied by the precipitant (hereinafter for convenience referred to as lime) added to the reaction tank 64. However, without the use of some medium to transfer alkalinity from the solid phase (lime) to the liquid phase, the alkalinity of the solution would be rapidly depleted during the carbonation step. Accordingly, for a given circulation rate in the system, production of sodium bicarbonate in the carbonator would be greatly reduced. This would necessitate an increased pumping or circulation rate in the system to the point where the process could become economically not feasible. The borate ion serves the function of effecting the alkalinity transfer from the lime to the liquid phase and can thus be considered an "alkalinity carrier". This alkalinity carrier has an acid form (boric acid) and a base form (borate ion), being in the base form as it leaves reaction tank 64. The clear liquid which is removed from ash filter 24 and which is used to dissolve the gas-solid contactor solids from contactor 4 is pumped to the carbonator 30 where the liquid phase alkalinity of the carrier is now exchanged for liquid phase bicarbonate alkalinity. This liquid phase bicarbonate alkalinity is now converted to the solid phase alkalinity of the sodium bicarbonate in the crystallizer. The alkalinity carrier in the clear liquid from the crystallizer 38 is now in the acid form, i.e., boric acid. Upon entering reaction tank 64, the boric acid once again contacts the solid phase alkalinity provided by the lime, and is converted into the basic form and the cycle repeated.

Preferred alkalinity carriers include boric acid and, when activated sodium carbonate is the sorbent, ammonia. It will also be apparent that the alkalinity carrier can be added in its acid or base form. Thus, for example, the borate ion may be added in the form of boric acid (acid form) or sodium tetraborate (base form), while the ammonia can be added in the form of ammonium sulfate or chloride or the like (acid form) or as ammonia gas (base form). Advantageously, both boric acid and ammonia are employed to minimize the possibility of boric acid precipitation in the crystallizer.

The limits for borate and ammonia may be determined from the following considerations. As alkalinity carriers, it is desirable to maximize their concentration. Boric acid solubility will limit the amount of borate that may be circulated. The solubility of boric acid decreases with a decrease in temperature. The coolest part of the circulating loop is the crystallizer effluent. In the crystallizer effluent almost all of the borate in the solution exists as un-ionized boric acid, $H_3BO_3$[or $B(OH)_3$]. The solubility of boric acid is dependent on solution composition as well as temperature. Solution composition is determined by both site specific factors (e.g., how much HCl or $NO_x$ are removed from the flue gas) and operating conditions. It is thus not possible to fix the maximum workable borate concentration without knowledge of these factors. The order of magnitude of the borate solubility may be obtained from solubility data reported by Linke (Linke, William F.

Solubilities: Inorganic and Metal-Organic Compounds. K-Z. Volume 11, 4th Ed., American Chemical Society, Washington, D.C. 1965).

| Temp, °C. | concentration, g/100 g $H_2O$ | | | | mole $H_3BO_3$ / Kg$H_2O$ |
|---|---|---|---|---|---|
| | NaCl | KCl | $Na_2SO_4$ | $H_3BO_3$ (saturated) | |
| 25 | 0 | 0 | 0 | 5.43 | 0.88 |
| 35 | 0 | 0 | 0 | 7.19 | 1.16 |
| 35 | 36.8 | 0 | 0 | 8.2 | 1.33 |
| 35 | 33.2 | 0 | 11.9 | 9.6 | 1.55 |

-continued

| Temp, | concentration, g/100 g H$_2$O | | | | mole H$_3$BO$_3$ |
|---|---|---|---|---|---|
| °C. | NaCl | KCl | Na$_2$SO$_4$ | H$_3$BO$_3$ (saturated) | KgH$_2$O |
| 35 | 0 | 41.0 | 0 | 11.6 | 1.88 |
| 35 | 0 | 0 | 53 | 13.1 | 2.12 |

The limitation on ammonia concentration is the vapor pressure of ammonia. This is greatest at high temperature and pH. An upper limit is the total solution vapor pressure (water, ammonia, and CO$_2$) of the solution equal to five atmosphere absolute (60 psig). For both borate and ammonia these general considerations apply anywhere in the system.

The following examples will serve to illustrate the preferred embodiments of the invention.

EXAMPLE I

Flue gas containing 700 lb. mole/hr. of SO$_2$ is treated with 760 lb. mole/hr. of activated sodium carbonate and reacts with 90 percent of the sulfur dioxide in the flue gas. The resulting solids are collected in a baghouse. The solids from the baghouse are dissolved using 1350 gal./min. of a recirculated liquor containing 2.6 m borate, 6.5 m sodium and other dissolved species such as chlorides, sulfites, sulfates, carbonates, calcium, etc. Also, makeup soda ash and borate are dissolved into the liquid at the rate of 28.6 lb. mole/hr. and 6.4 lb. mole/hr., respectively. The resulting liquor is then carbonated with 760 lb. mole/hr. of CO$_2$ from a combination of clean flue gas, and CO$_2$ recycled from other parts of the process in the carbonator and crystallizer. The carbonated liquor is cooled to 95° F. in the crystallizer to precipitate 1520 lb. mole/hr. of sodium bicarbonate. The sodium bicarbonate solids are separated from the liquor, dried and calcined at 300° F. to form an activated sodium carbonate which is recycled to the baghouse to treat the flue gas. The separated liquor is passed through a CO$_2$ stripping column to remove 90 lb. mole/hr. of carbonate dioxide from the liquor. The liquor leaving the CO$_2$ stripping column is treated with 660 lb. mole/hr. of lime in a reaction tank to precipitate calcium sulfite and/or calcium sulfate solids. These solids are separated from the slurry leaving the reaction tank and constitute the waste product. The separated liquor is recycled as noted above to dissolve the baghouse solids.

The following Examples II-III, when run in accordance with the general procedure of Example I, but for the presence or absence of an alkalinity carrier as indicated in the following table, demonstrate that the circulation rate would be increased at least a thousandfold (if even technically feasible) without an alkalinity carrier.

| Example | molality, moles/KgH$_2$O | | Circulation Rate |
|---|---|---|---|
| | Ammonia | Borate | gpm |
| I | .0 | 2.6 | 1,350 |
| II | 1.3 | 1.3 | 1,350 |
| III | 0 | 0 | 1,350,000+ |

While the foregoing description is illustrative of the preferred embodiments of the process of the invention, numerous obvious variations and modifications will be apparent to one of ordinary skill, and accordingly, it is intended that the invention be limited only by the appended claims.

What is claimed is:

1. A method for the removal of sulfur oxide from an industrial waste gas containing same comprising:
   (a) contacting said gas with a sorbent selected from activated sodium carbonate, sodium bicarbonate, trona and mixtures thereof, either dissolved or slurried in water or as a solid, in an amount sufficient to react with substantially all of the sulfur oxide present in said gas to form solids of unreacted sorbent, sodium sulfite, sulfate, and mixtures thereof, and a waste gas substantially free of sulfur oxide;
   (b) venting the resultant waste gas from the process, dissolving said solids in an alkaline liquor containing borate ion to form soluble sodium compounds;
   (c) carbonating the resultant alkaline sodium liquor from step (b) and cooling to a temperature sufficient to form sodium bicarbonate or trona crystals;
   (d) separating the sodium bicarbonate or trona crystals from the liquor of step (c) and recycling said crystals to step (a) or heating said crystals for a time and temperature sufficient to form activated sodium carbonate, and recycling said activated sodium carbonate to step (a); and
   (e) removing carbon dioxide from the cooled liquor of step (c), adding a precipitant selected from the class consisting of alkaline earth metal hydroxides, oxides and mixtures thereof, to the resultant liquor to render it alkaline and form insoluble solids comprising alkaline earth metal sulfates, sulfites and mixtures thereof, separating said solids and recycling the resultant alkaline liquor to step (b).

2. The method of claim 1 wherein said liquor containing said borate ion contains, in addition, dissolved ammonia.

3. The method of claim 1 wherein said sorbent comprises trona.

4. The method of claim 1 wherein said sorbent comprises sodium bicarbonate.

5. The method of claim 1 wherein said sorbent comprises activated sodium carbonate.

6. The method of claim 1 wherein said precipitant comprises calcium oxide.

7. The method of claim 1 wherein said precipitant comprises calcium hydroxide.

8. The method of claim 1 wherein boric acid is employed to provide the borate ion.

9. The method of claim 1 wherein an activated sodium carbonate sorbent is employed with boric acid and ammonia alkalinity carriers.

10. The method of claim 1 wherein sodium tetraborate is employed to provide the borate ion.

11. The method of claim 1, step c, wherein CO$_2$ is added to the crystallizer to drive the crystallization of the sodium bicarbonate toward completion.

* * * * *